United States Patent [19]

Carter et al.

[11] Patent Number: 5,491,464
[45] Date of Patent: Feb. 13, 1996

[54] REMOTELY CONTROLLED RADAR GUN AND VIDEO RECORDING APPARATUS

[76] Inventors: Conrad C. Carter; Sharon G. Carter, both of 51 Parkhaven Dr., Vallejo, Calif. 94591

[21] Appl. No.: 209,271

[22] Filed: Mar. 14, 1994

[51] Int. Cl.[6] ...................................... B60Q 1/00
[52] U.S. Cl. .................. 340/425.5; 340/473; 342/104; 352/132; 348/148; 348/149
[58] Field of Search ................ 340/468, 425.5, 340/936, 937, 472, 473, 471, 933; 342/20, 25, 27, 28, 50, 66, 64, 104; 348/149, 118, 148, 151, 152, 156, 143; 352/131, 132; 354/81, 126

[56] References Cited

U.S. PATENT DOCUMENTS

| | | | |
|---|---|---|---|
| 3,789,358 | 1/1974 | Ellis | 340/73 |
| 3,997,868 | 12/1976 | Ribnick et al. | 340/902 |
| 4,063,258 | 12/1977 | Allen | 354/81 |
| 4,104,614 | 8/1978 | Litman | 340/472 |
| 4,135,188 | 1/1979 | Bickley, Jr. et al. | 342/104 |
| 4,173,010 | 10/1979 | Hoffmann | 340/936 |
| 4,543,622 | 9/1985 | Menke et al. | 362/219 |
| 4,772,942 | 9/1988 | Tuck | 348/148 |
| 4,789,904 | 12/1988 | Peterson | 348/148 |
| 4,931,768 | 6/1990 | Jincks et al. | 340/473 |
| 4,988,994 | 1/1991 | Loeven | 340/936 |
| 5,121,200 | 6/1992 | Choi | 348/148 |
| 5,280,266 | 1/1994 | Kao | 348/156 |
| 5,282,182 | 1/1994 | Kreuzer et al. | 348/148 |
| 5,319,394 | 6/1994 | Dukek | 348/148 |

*Primary Examiner*—Brent A. Swarthout
*Assistant Examiner*—Benjamin C. Lee

[57] ABSTRACT

A new and improved remotely-controlled radar gun apparatus is provided for a motor vehicle which has a metal roof. A remote-controlled radar gun assembly is mounted on a roof-mounted support assembly, and a radar-gun control module is contained within an interior portion of the motor vehicle. The radar-gun control module is connected to the remote-controlled radar gun assembly by a cable assembly, such that a quantity of metal in the roof of the motor vehicle provides a protective barrier to a police officer inside the motor vehicle from radar waves emitted by the remote-controlled radar gun assembly. The roof-mounted support assembly also supports a plurality of flashing light assemblies. In addition, a new and improved remotely-controlled video recording apparatus is provided which includes a plurality of remote-controlled video camera assemblies mounted on a roof-mounted support assembly, and a video camera actuator assembly remotely connected to the remote-controlled video camera assemblies by a cable. The remote-controlled video camera assemblies are also connected to a siren actuator and to a flashing light actuator and are automatically activated by the video camera actuator assembly when either the siren actuator or the flashing light actuator is actuated by the police officer. A timer module automatically deactuates some remote-controlled video camera assemblies after completion of a predetermined period of time after the siren is turned off.

13 Claims, 4 Drawing Sheets

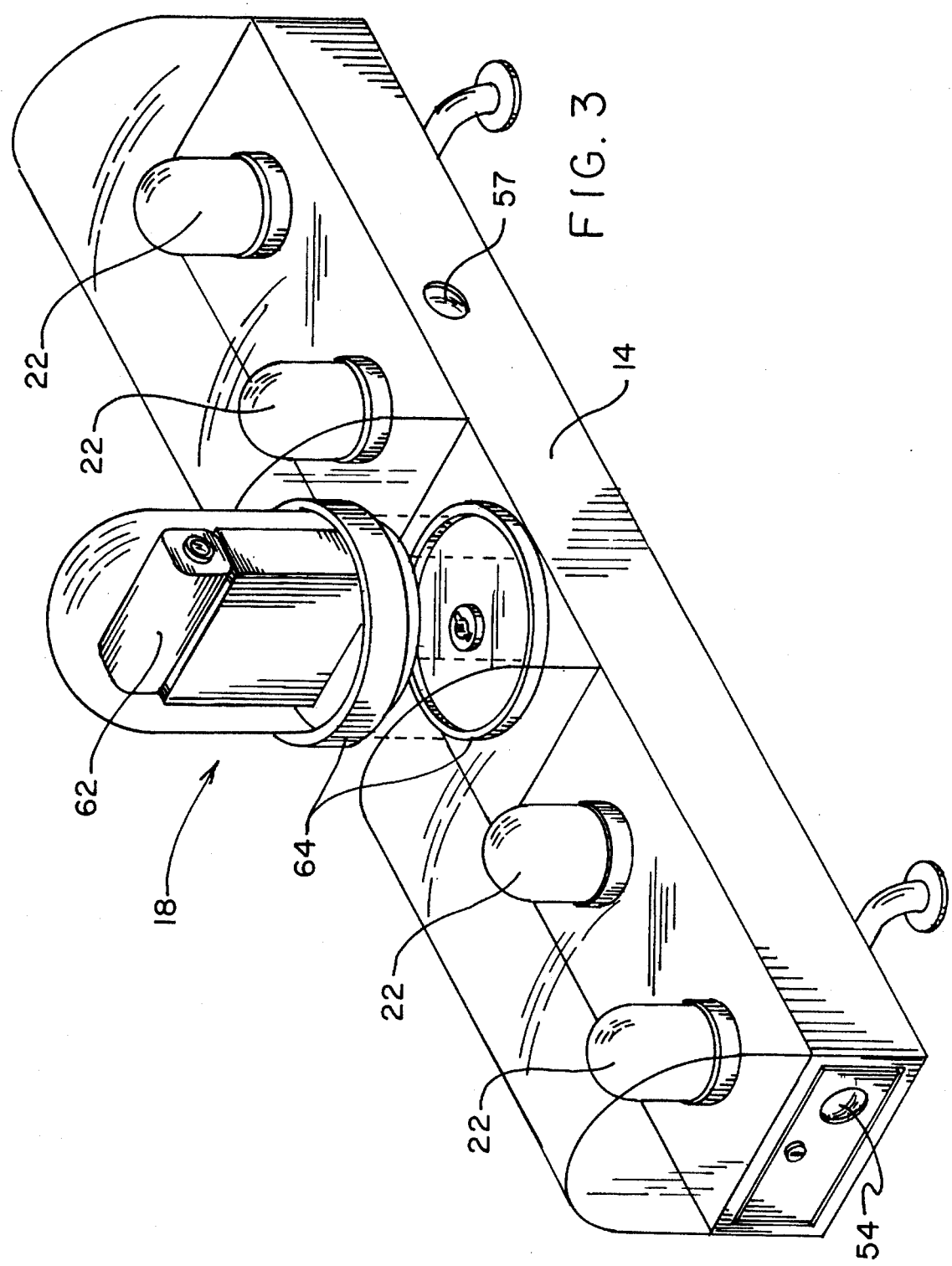

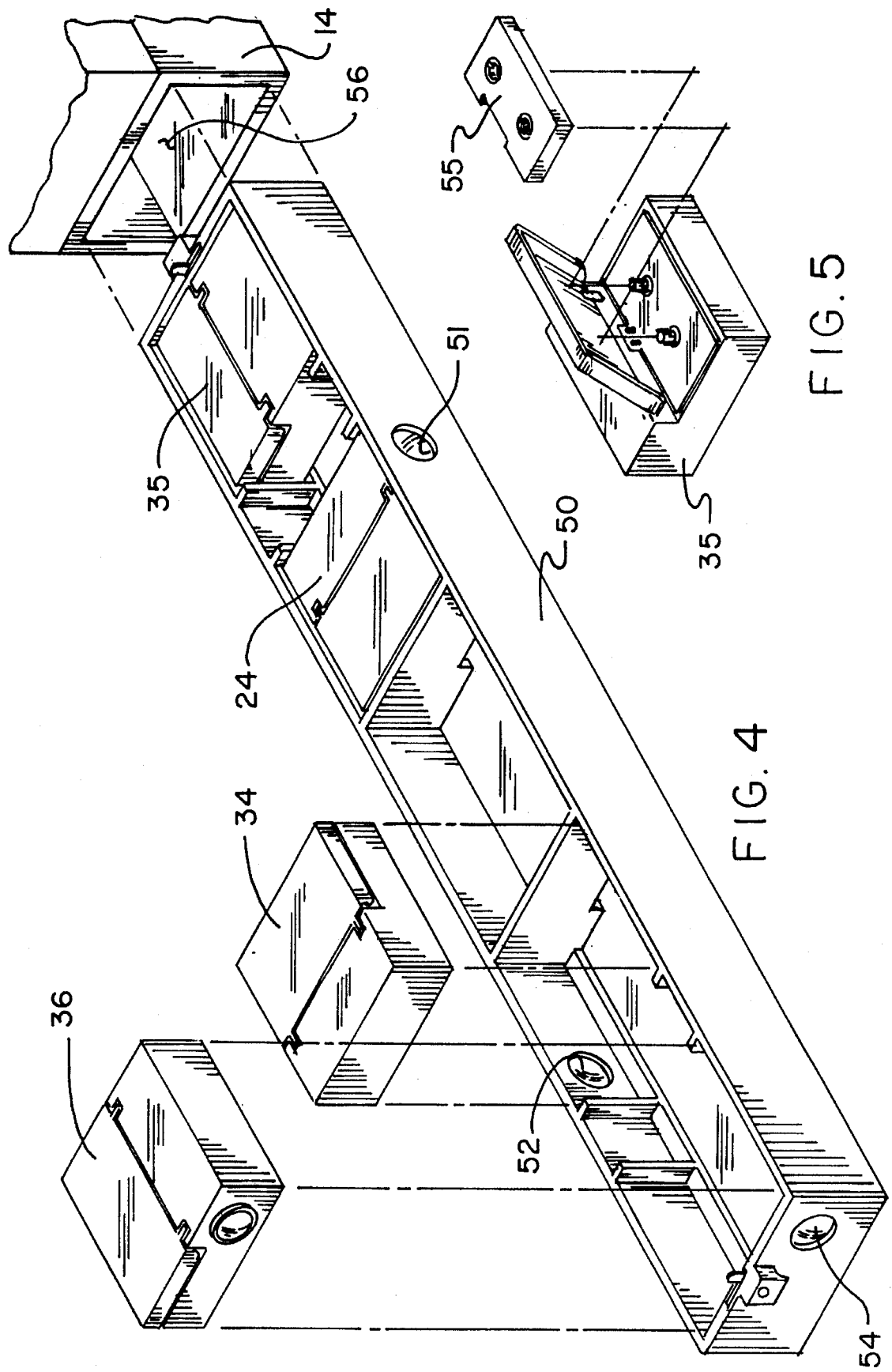

REMOTELY CONTROLLED RADAR GUN AND VIDEO RECORDING APPARATUS

BACKGROUND OF THE INVENTION

1. Field of the Invention

The present invention relates generally to police cars and, more particularly, to radar guns and video cameras associated with police cars.

2. Description of the Prior Art

One problem currently associated with police cars is that when a police officer is repeatedly exposed to radar waves from a radar gun, the police officer may have an increased risk of cancer. In this respect, it would be desirable if a radar gun device were installed on a police car in a location remote from the police officer who is aiming and using the radar gun.

Another problem currently associated with law enforcement is the interaction between the police officer and the suspect during an arrest and questioning. A suspect may fabricate a story of improper conduct by a police officer. On the other hand, a police officer may act improperly toward a suspect. In this respect, it would be desirable if an audio and video recording device were provided which recorded the events leading up to and occurring during an arrest and custodial situation. By there being a recording made of the events leading up to and occurring during an arrest or custodial situation, a police officer may be deterred from acting improperly. Furthermore, the recording of the events may deter a suspect from fabricating a false story about improper police conduct. Such a recording device would serve to protect both the police officer and the suspect from false accusations and improper conduct.

To some extent, video cameras are currently in use in law enforcement. The video cameras are hand carried and take a police officer away from normal police duties. In this respect, it would be desirable if a video recording device were provided did not take police officer away from normal police duties.

Often, when a police officer in a police car is contemplating stopping a suspect, the police officer turns on the siren and flashing lights of the police car. In this respect, it would be desirable if a device were provided that automatically turned on an audio and video recording device when the siren and flashing lights of the police car are turned on.

Once a suspect is placed on the back seat of the police car, the conduct of the suspect and the conduct of the police officer may be very important. In this respect, it would be desirable if a device were provided that automatically turned on an audio and video recording device when a suspect sat on the back seat of a police car.

To protect a police officer from unwanted exposure to radar waves from a radar gun, it would be desirable if the police officer were shielded from the radar gun by a metal barrier. Thus, it would be desirable if a remotely-controlled radar gun were shielded from the police officer by a metal shield.

Once a police car gives chase to a suspect, the most important areas of interaction between the suspect and the police officer are generally either in front of the police car, as the police car follows the suspect's vehicle, and behind the police car, when the police car pulls in front of the suspects vehicle. Thus, it would be desirable if an audio and video recording device would record events taking place in front of and behind the police car.

To assure that the recording of audio and video information is not prematurely halted, it would be desirable if the audio and video recording device would include a timer assembly to assure that the audio and video recording takes place for a predetermined period of time.

Generally a police car has a light fixture, for flashing lights, mounted on the roof of the police car. For both aesthetic and utilitarian purposes, it would be desirable if a remotely-controlled radar gun and video recording apparatus could be mounted on a roof-mounted light fixture of a police car.

Throughout the years, a number of innovations have been developed relating to roof-mounted light fixtures, and the following U.S. Pat. Nos. are representative of some of those innovations: 3,789,358; 3,997,868; 4,104,614; 4,543,622; and 4,931,768. It is noted that none of the above-cited patents disclose any root-mounted light fixture that includes either a radar gun or an audio and video recording device.

Thus, while the foregoing body of prior art indicates it to be well known to use radar guns and video cameras in police work, the prior art described above does not teach or suggest a remotely-controlled radar gun and video recording apparatus which has the following combination of desirable features: (1) a radar gun device installed on a police car in a location remote from the police officer who is aiming and using the radar gun; (2) an audio and video recording device for recording the events leading up to and occurring during an arrest and custodial situation; (3) automatically turns on an audio and video recording device when the siren and flashing lights of the police car are turned on; (4) automatically turns on an audio and video recording device when a suspect sits on the back seat of a police car; (5) shields the police officer from the radar gun by a metal barrier; (6) records events taking place in front of and behind the police car; (7) is mounted on a roof-mounted light fixture of the police car; (8) includes a timer assembly to assure that the audio and video recording process takes place for a predetermined period of time; and (9) does not take a police officer away from normal police duties. The foregoing desired characteristics are provided by the unique remotely-controlled radar gun and video recording apparatus of the present invention as will be made apparent from the following description thereof. Other advantages of the present invention over the prior art also will be rendered evident.

SUMMARY OF THE INVENTION

To achieve the foregoing and other advantages, the present invention, briefly descried, provides a new and improved remotely-controlled radar gun apparatus for a motor vehicle which has a metal roof. The remotely-controlled radar gun apparatus includes a support assembly mounted on the roof of the motor vehicle. A remote-controlled radar gun assembly is mounted on the roof-mounted support assembly, and a radar-gun control module is contained within an interior portion of the motor vehicle and is connected to the remote-controlled radar gun assembly by a cable assembly for controlling the remote-controlled radar gun assembly, such that a quantity of metal in the roof of the motor vehicle provides a protective barrier to a police officer inside the motor vehicle from radar waves emitted by the remote-controlled radar gun assembly.

The remote-controlled radar gun assembly includes a radar gun unit, and a rotation assembly. The rotation assembly is supported by the roof-mounted support assembly and is used for supporting the radar gun unit and for rotating the radar gun unit. The roof-mounted support assembly also supports a plurality of flashing light assemblies.

In accordance with another aspect of the present invention, a new and improved remotely-controlled video recording apparatus is provided for a motor vehicle which has a roof, a siren, lights capable of flashing, a siren actuator in the motor vehicle interior, and a flashing light actuator in the motor vehicle interior. The remotely-controlled video recording apparatus includes a support assembly mounted on the roof of the motor vehicle.

A first remote-controlled video camera assembly is mounted on the roof-mounted support assembly, and a video camera actuator assembly is connected to the first remote-controlled video camera assembly by a cable at a location remote from the first remote-controlled video camera assembly. The first remote-controlled video camera assembly is also connected to the siren actuator or to the flashing light actuator. The first remote-controlled video camera assembly is automatically activated by the video camera actuator assembly when the siren actuator or the flashing light actuator is actuated by a police officer. A timer module is provided for automatically deactuating the first remote-controlled video camera assembly after completion of a predetermined period of time. The timer module automatically deactuates the first remote-controlled video camera assembly after completion of a predetermined period of time after the siren is turned off.

The first remote-controlled video camera assembly is positioned on the roof-mounted support assembly so that the first remote-controlled video camera assembly records activity in front of the motor vehicle.

A second remote-controlled video camera assembly is mounted on the roof-mounted support assembly and is connected to the video camera actuator assembly. The second remote-controlled video camera assembly is automatically activated by the video camera actuator assembly when the siren actuator or the flashing light actuator is actuated by a police officer. The second remote-controlled video camera assembly is positioned on the roof-mounted support assembly so that the second remote-controlled video camera assembly records activity behind the motor vehicle.

A third remote-controlled video camera assembly is mounted on the roof-mounted support assembly and is connected to the video camera actuator assembly. The third remote-controlled video camera assembly is automatically activated by the video camera actuator assembly when the siren actuator or the flashing light actuator is actuated by a police officer. The third remote-controlled video camera assembly is positioned on the roof-mounted support assembly so that the third remote-controlled video camera assembly records activity on a left side of the motor vehicle.

A fourth remote-controlled video camera assembly is mounted on the roof-mounted support assembly and is connected to the video camera actuator assembly. The fourth remote-controlled video camera assembly is automatically activated by the video camera actuator assembly when the siren actuator or the flashing light actuator is actuated by a police officer. The fourth remote-controlled video camera assembly is positioned on the roof-mounted support assembly so that the fourth remote-controlled video camera assembly records activity on a right side of the motor vehicle.

A fifth remote-controlled video camera assembly is mounted on an interior surface of the roof of the motor vehicle, and a pressure-actuated video camera actuator assembly is located in a back seat of the motor vehicle. The pressure-actuated video camera actuator assembly is connected to the fifth remote-controlled video camera assembly. The fifth remote-controlled video camera assembly is automatically activated by the pressure-actuated video camera actuator assembly when a person sits on the back seat. The fifth remote-controlled video camera assembly is positioned on the interior surface of the roof of the motor vehicle so that the fifth remote-controlled video camera assembly records activity on the back seat of the motor vehicle.

Also, in accordance with the present invention, the remote-controlled radar gun assembly and the remote-controlled video camera assemblies can be combined into an integrated remotely-controlled radar gun and video recording apparatus.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carded out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved remotely-controlled radar gun and video recording apparatus which has all of the advantages of the prior art and none of the disadvantages.

It is another object of the present invention to provide a new and improved remotely-controlled radar gun and video recording apparatus which may be easily and efficiently manufactured and marketed.

It is a further object of the present invention to provide a new and improved remotely-controlled radar gun and video recording apparatus which is of durable and reliable construction.

An even further object of the present invention is to provide a new and improved remotely-controlled radar gun and video recording apparatus which is susceptible of a low cost of manufacture with regard to both materials and labor, and which accordingly is then susceptible of low prices of sale to the consuming public, thereby making such remotely-controlled radar gun and video recording apparatus available to the buying public.

Still yet a further object of the present invention is to provide a new and improved remotely-controlled radar gun and video recording apparatus which a radar gun device installed on a police car in a location remote from the police officer who is aiming and using the radar gun.

Still another object of the present invention is to provide a new and improved remotely-controlled radar gun and video recording apparatus that an audio and video recording device for recording the events leading up to and occurring during an arrest and custodial situation.

Yet another object of the present invention is to provide a new and improved remotely-controlled radar gun and video recording apparatus which automatically turns on an audio and video recording device when the siren and flashing lights of the police car are turned on.

Even another object of the present invention is to provide a new and improved remotely-controlled radar gun and video recording apparatus that automatically turns on an audio and video recording device when a suspect sits on the back seat of a police car.

Still a further object of the present invention is to provide a new and improved remotely-controlled radar gun and video recording apparatus which shields the police officer from the radar gun by a metal barrier.

Yet another object of the present invention is to provide a new and improved remotely-controlled radar gun and video recording apparatus that records events taking place in front of and behind the police car.

Still another object of the present invention is to provide a new and improved remotely-controlled radar gun and video recording apparatus which is mounted on a roof-mounted light fixture of the police car.

Yet another object of the present invention is to provide a new and improved remotely-controlled radar gun and video recording apparatus that includes a timer assembly to assure that the audio and video recording process takes place for a predetermined period of time.

It is another object of the present invention to provide a new and improved remotely-controlled radar gun and video recording apparatus which does not take a police officer away from normal police duties.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged, partially exploded, perspective view of the embodiment of the remotely-controlled radar gun and video recording apparatus of FIG. 2.

FIG. 4 is a partially exploded perspective view of a video camera storage container used with the remotely-controlled radar gun and video recording apparatus of the invention.

FIG. 5 is a partially exploded perspective view of a video camera and a video cassette used with the invention.

DESCRIPTION OF THE PREFERRED EMBODIMENT

With reference to the drawings, a new and improved remotely-controlled radar gun and video recording apparatus embodying the principles and concepts of the present invention will be described.

Figure 2:
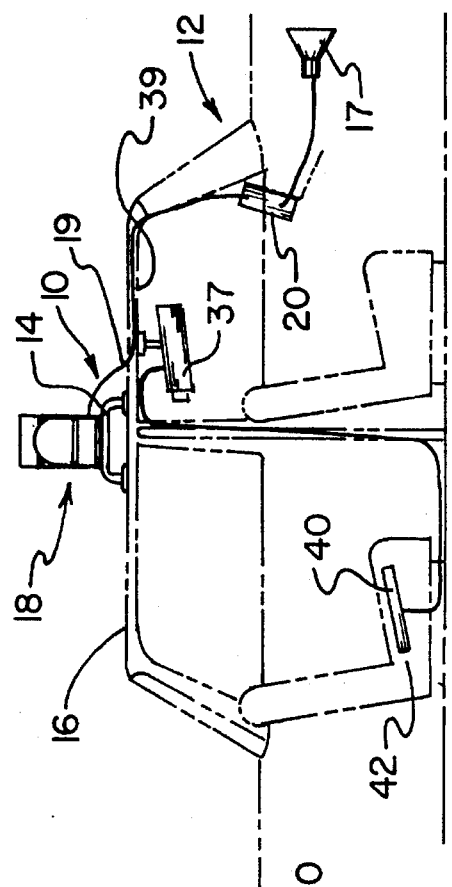
FIG. 2 is a cross-sectional view of the embodiment of the remotely-controlled radar gun and video recording apparatus shown in FIG. 1 taken along line 2—2 of FIG. 1 showing an interior-mounted video camera.
Figure 1:
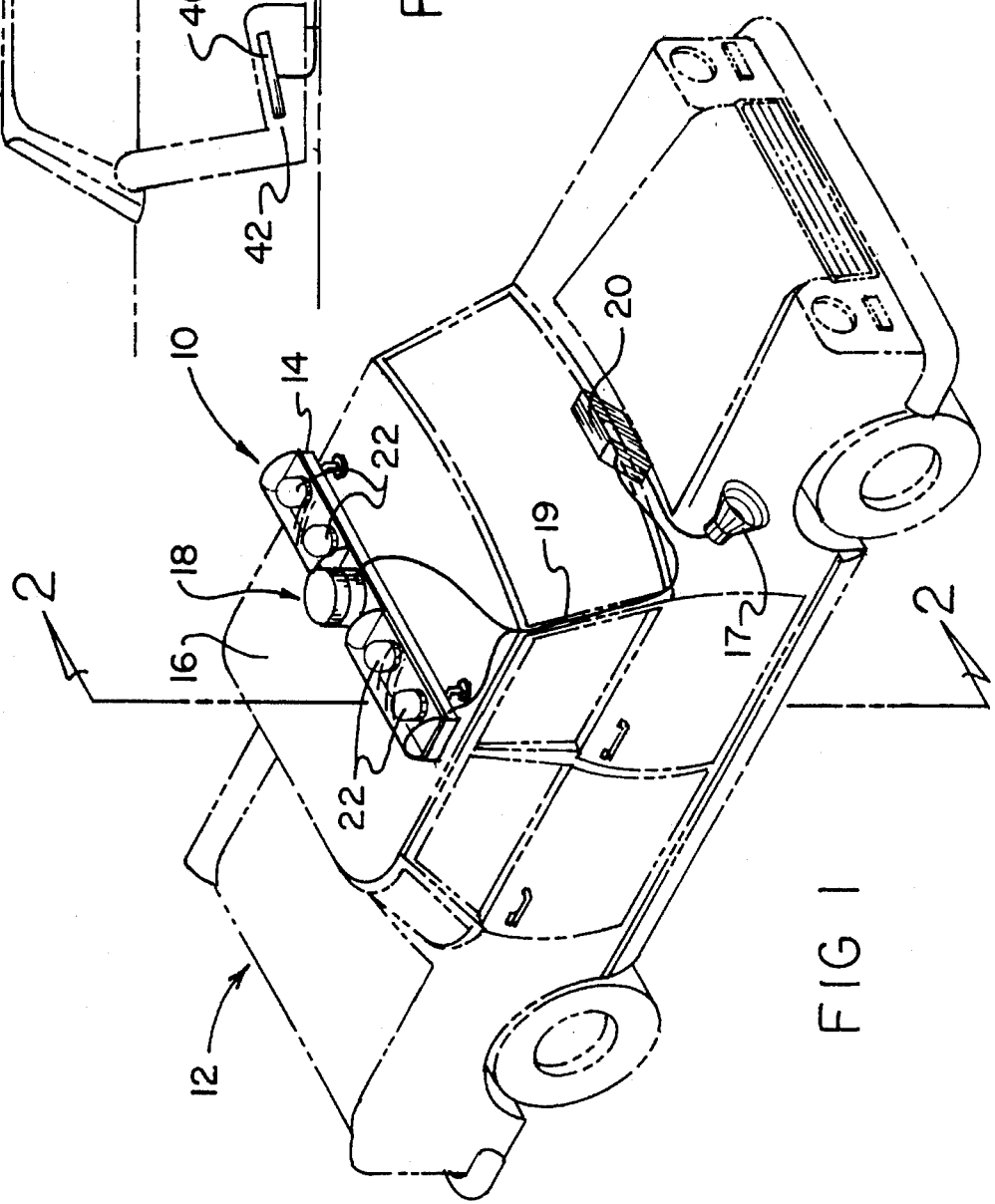
FIG. 1 is a perspective view showing a preferred embodiment of the remotely-controlled radar gun and video recording apparatus of the invention on stalled on the roof of a police car.
Figure 6:
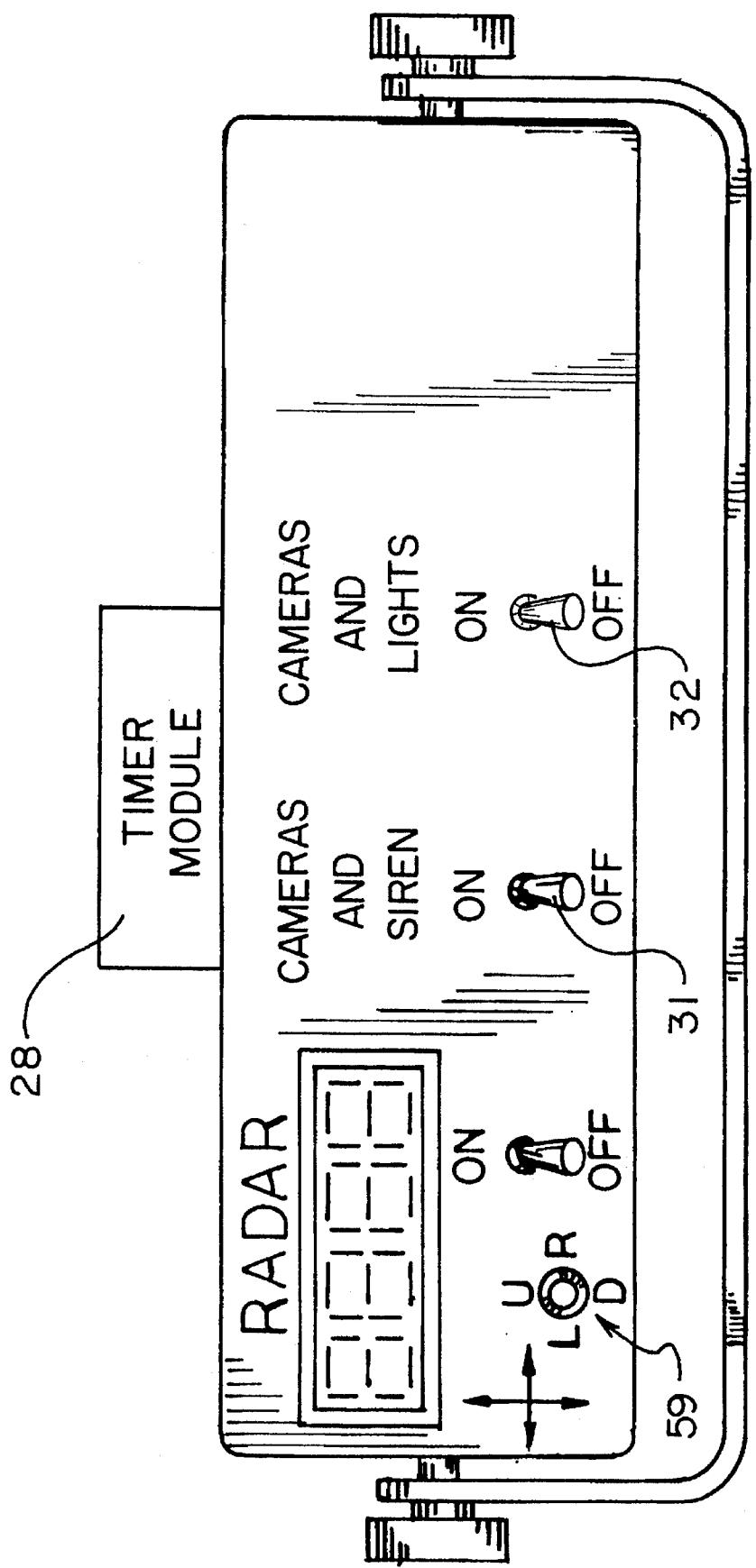
FIG. 6 is a front view of a control panel used with the remotely-controlled radar gun and video recording apparatus of the invention.

Turning to FIGS. 1–6, there is shown an exemplary embodiment of the remotely-controlled radar gun and video recording apparatus of the invention generally designated by reference numeral 10. In its preferred form, remotely-controlled radar gun and video recording apparatus 10 is provided for a motor vehicle 12 which has a metal roof 16, a siren 17, lights 22 capable of flashing, a siren actuator 31 in the motor vehicle interior (see FIG. 6), and a flashing light actuator 32 in the motor vehicle interior (see FIG. 6).

In the remotely-controlled radar gun and video recording apparatus, a remotely-controlled radar gun apparatus includes a support assembly 14 mounted on the roof 16 of the motor vehicle 12. A remote-controlled radar gun assembly 18 is mounted on the roof-mounted support assembly 14, and a radar-gun control module 20 is contained within an interior portion of the motor vehicle 12 and is connected to the remote-controlled radar gun assembly 18 by a cable assembly 19 for controlling the remote-controlled radar gun assembly 18, such that a quantity of metal in the roof 16 of the motor vehicle 12 provides a protective barrier to a police officer inside the motor vehicle 12 from radar waves emitted by the remote-controlled radar gun assembly 18.

As shown in FIG. 3, the remote-controlled radar gun assembly 18 includes a radar gun unit 62, and a rotation assembly 64. The rotation assembly 64 is supported by the roof-mounted support assembly 14 and is used for supporting the radar gun unit 62 and for rotating the radar gun unit 62. A tilting assembly may also be provided for tilting the radar gun unit 62 forward and backward. The radar-gun control module 20 can include an actuator 59 for controlling the fight and left rotation and the tilting of the radar gun unit 62. The roof-mounted support assembly 14 also supports a plurality of flashing light assemblies 22.

In the remotely-controlled radar gun and video recording apparatus of the invention, a remotely-controlled video recording apparatus 10 includes a support assembly 14 mounted on the roof 16 of the motor vehicle 12. A first remote-controlled video camera assembly 24 is mounted on the roof-mounted support assembly 14, and a video camera actuator assembly 30 is connected to the first remote-controlled video camera assembly 24 by a cable 19 at a location remote from the first remote-controlled video camera assembly 24. The first remote-controlled video camera assembly 24 is also connected to the siren actuator 31 or to the flashing light actuator 32. The first remote-controlled video camera assembly 24 is automatically activated by the video camera actuator assembly 30 when the siren actuator 31 or the flashing light actuator 32 is actuated by a police officer.

A video camera actuator assembly 30 and the siren actuator 31 can be integrated into the same switch assembly. Similarly, the video camera actuator assembly 30 and the siren or flashing light actuator 32 can be integrated into the same switch assembly. A video camera assembly records both audio and video information.

A timer module 28 is provided for automatically deactuating the first remote-controlled video camera assembly 24 after completion of a predetermined period of time, for example one hour. More specifically, the timer module 28 automatically deactuates the first remote-controlled video camera assembly 24 after completion of a predetermined period of time after the siren 17 is turned off, for example one hour.

The first remote-controlled video camera assembly 24 is positioned on the roof-mounted support assembly 14 so that the first remote-controlled video camera assembly 24 records activity in front of the motor vehicle 12.

A second remote-controlled video camera assembly 34 is mounted on the root-mounted support assembly 14 and is connected to the video camera actuator assembly 30. The second remote-controlled video camera assembly 34 is automatically activated by the video camera actuator assembly 30 when the siren actuator 31 or the flashing light actuator 32 is actuated by a police officer. The second remote-controlled video camera assembly 34 is positioned on the roof-mounted support assembly 14 so that the second remote-controlled video camera assembly 34 records activity behind the motor vehicle 12.

A third remote-controlled video camera assembly 35 is mounted on the roof-mounted support assembly 14 and is connected to the video camera actuator assembly 30. The third remote-controlled video camera assembly 35 is automatically activated by the video camera actuator assembly 30 when the siren actuator 31 or the flashing light actuator 32 is actuated by a police officer. The third remote-controlled video camera assembly 35 is positioned on the roof-mounted support assembly 14 so that the third remote-controlled video camera assembly 35 records activity on a left side of the motor vehicle 12.

A fourth remote-controlled video camera assembly 36 is mounted on the roof-mounted support assembly 14 and is connected to the video camera actuator assembly 30. The fourth remote-controlled video camera assembly 36 is automatically activated by the video camera actuator assembly 30 when the siren actuator 31 or the flashing light actuator 32 is actuated by a police officer. The fourth remote-controlled video camera assembly 36 is positioned on the roof-mounted support assembly 14 so that the fourth remote-controlled video camera assembly 36 records activity on a fight side of the motor vehicle 12.

A fifth remote-controlled video camera assembly 37 is mounted on an interior surface 39 of the roof 16 of the motor vehicle 12, and a pressure-actuated video camera actuator assembly 40 is located in a back seat 42 of the motor vehicle 12. The pressure-actuated video camera actuator assembly 40 is connected to the fifth remote-controlled video camera assembly 37. The fifth remote-controlled video camera assembly 37 is automatically activated by the pressure-actuated video camera actuator assembly 40 when a person sits on the back seat 42. The fifth remote-controlled video camera assembly 37 is positioned on the interior surface 39 of the roof 16 of the motor vehicle 12 so that the fifth remote-controlled video camera assembly 37 records activity on the back seat 42 of the motor vehicle 12. The fifth remote-controlled video camera assembly 37 is actuated to record activity on the back seat 42 so long as the pressure-actuated video camera actuator assembly 40 is activated. The fifth remote-controlled video camera assembly 37 is not controlled by a timer module 28 for a predetermined period of time.

As shown in FIG. 4, respective first, second, third, and fourth remote-controlled video camera assemblies can be mounted in a drawer assembly 50 that slides into and out of a drawer-receiving channel 56 in the roof-mounted support assembly 14. The drawer assembly 50 has a first aperture 51 for admitting visual imagery through the drawer assembly 50 to the first remote-controlled video camera assembly 24. The drawer assembly 50 has a second aperture 52 for admitting visual imagery through the drawer assembly 50 to the second remote-controlled video camera assembly 34. The drawer assembly 50 has a third aperture for admitting visual imagery through the drawer assembly 50 to the third remote-controlled video camera assembly 35. The drawer assembly 50 has a fourth aperture 54 for admitting visual imagery through the drawer assembly 50 to the fourth remote-controlled video camera assembly 36. The drawer-receiving channel 56 has respective apertures 57 that are placed in registration with the respective apertures in the drawer assembly 50 for admitting visual imagery to the respective remote-controlled video camera assemblies.

As shown in FIG. 5, a video tape cassette 55 can be loaded into a respective remote-controlled video camera assembly.

The components of the remotely-controlled radar gun and video recording apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remotely-controlled radar gun and video recording apparatus that is low in cost, relatively simple in design and operation, and which may advantageously be used to install a radar gun device on a police car in a location remote from the police officer who is aiming and using the radar gun. With the invention, a remotely-controlled radar gun and video recording apparatus is provided which an audio and video recording device for recording the events leading up to and occurring during an arrest and custodial situation. With the invention, a remotely-controlled radar gun and video recording apparatus is provided which automatically turns on an audio and video recording device when the siren and flashing lights of the police car are turned on. With the invention, a remotely-controlled radar gun and video recording apparatus is provided which automatically turns on an audio and video recording device when a suspect sits on the back seat of a police car. With the invention, a remotely-controlled radar gun and video recording apparatus is provided which shields the police officer from the radar gun by a metal barrier. With the invention, a remotely-controlled radar gun and video recording apparatus is provided which records events taking place in front of and behind the police car. With the invention, a remotely-controlled radar gun and video recording apparatus is provided which is mounted on a roof-mounted light fixture of the police car. With the invention, a remotely-controlled radar gun and video recording apparatus is provided which includes a timer assembly to assure that the audio and video recording process takes place for a predetermined period of time. With the invention, a remotely-controlled radar gun and video recording apparatus is provided which does not take a police officer away from normal police duties.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved remotely-controlled video recording apparatus for a motor vehicle which has a roof, a siren, lights capable of flashing, a siren actuator in the motor vehicle interior, and a flashing light actuator in the motor vehicle interior, comprising:

a roof-mounted support assembly mounted on the roof of the motor vehicle, a first remote-controlled video camera assembly mounted on said roof-mounted support assembly, a video camera actuator assembly, connected to said first remote-controlled video camera assembly at a location remote from said first remote-controlled video camera assembly and connected to the siren actuator and to the flashing light actuator, wherein said first remote-controlled video camera assembly is automatically activated by said video camera actuator assembly when either the siren actuator or the flashing light actuator is actuated by a police officer, and a timer module, for automatically deactuating said first remote-controlled video camera assembly after completion of a predetermined period of time, wherein said timer module automatically deactuates said first remote-controlled video camera assembly after completion of the predetermined period of time after the siren is turned off.

2. The apparatus described in claim 1 wherein said first remote-controlled video camera assembly is positioned on said roof-mounted support assembly so that said first remote-controlled video camera assembly records activity in front of the motor vehicle.

3. The apparatus described in claim 2, further including:

a second remote-controlled video camera assembly mounted on said roof-mounted support assembly and connected to said video camera actuator assembly, wherein said second remote-controlled video camera assembly is automatically activated by said video camera actuator assembly when either the siren actuator or the flashing light actuator is actuated by the police officer.

4. The apparatus described in claim 3, further including:

a third remote-controlled video camera assembly mounted on said roof-mounted support assembly and connected to said video camera actuator assembly, wherein said third remote-controlled video camera assembly is automatically activated by said video camera actuator assembly when either the siren actuator or the flashing light actuator is actuated by the police officer.

5. The apparatus described in claim 4, further including:

a fourth remote-controlled video camera assembly mounted on said roof-mounted support assembly and connected to said video camera actuator assembly, wherein said fourth remote-controlled video camera assembly is automatically activated by said video camera actuator assembly when either the siren actuator or the flashing light actuator is actuated by the police officer.

6. The apparatus described in claim 5 wherein said fourth remote-controlled video camera assembly is positioned on said roof-mounted support assembly so that said fourth remote-controlled video camera assembly records activity on a right side of the motor vehicle.

7. The apparatus described in claim 4 wherein said third remote-controlled, video camera assembly is positioned on said roof-mounted support assembly so that said third remote-controlled video camera assembly records activity on a left side of the motor vehicle.

8. The apparatus described in claim 3 wherein said second remote-controlled video camera assembly is positioned on said roof-mounted support assembly so that said second remote-controlled video camera assembly records activity behind the motor vehicle.

9. A new and improved remotely-controlled radar gun apparatus for a motor vehicle which has a metal roof, comprising:

a roof-top-mounted support assembly mounted on the roof top of the motor vehicle, a remote-controlled radar gun assembly mounted on said roof-top-mounted support assembly, wherein said remote-controlled radar gun assembly includes a radar gun unit and a rotation assembly for rotating said radar gun unit, and a radar-gun control module contained within an interior portion of the motor vehicle and connected to said remote-controlled radar gun assembly by a cable assembly for controlling said remote-controlled radar gun assembly, such that a quantity of metal in the roof of the motor vehicle provides a protective barrier to a police officer inside the motor vehicle from radar waves emitted by said remote-controlled radar gun assembly.

10. The apparatus described in claim 1 wherein said roof-top-mounted support assembly also supports a plurality of flashing light assemblies.

11. A new and improved remotely-controlled video recording apparatus for a motor vehicle which has a roof, a siren, lights capable of flashing, a siren actuator in the motor vehicle interior and a flashing light actuator in the motor vehicle interior, comprising:

a roof-mounted support assembly mounted on the roof of the motor vehicle, a first remote-controlled video camera assembly mounted on said roof-mounted support assembly, a video camera actuator assembly, connected to said first remote-controlled video camera assembly at a location remote from said first remote-controlled video camera assembly and connected to the siren actuator and to the flashing light actuator, wherein said first remote-controlled video camera assemble is automatically activated by said video camera actuator assembly when either the siren actuator or the flashing light actuator is actuated by a police officer, wherein said first remote-controlled video camera assembly is positioned on said roof-mounted support assembly so that said first remote-controlled video camera assembly records activity in front of the motor vehicle, an interior remote-controlled video camera assembly mounted on an interior surface of the roof of the motor vehicle, and a pressure-actuated video camera actuator assembly located in a back seat of the motor vehicle, wherein said pressure-actuated video camera actuator assembly is connected to said interior remote-controlled video camera assembly, wherein said interior remote-controlled video camera assembly is automatically activated by said pressure-actuated video camera actuator assembly when a person sits on the back seat.

12. The apparatus described in claim 11 wherein said interior remote-controlled video camera assembly is positioned on the interior surface of the roof of the motor vehicle so that said interior remote-controlled video camera assembly records activity on the back seat of the motor vehicle.

13. A new and improved remotely-controlled radar gun and remotely-controlled video recording apparatus for a motor vehicle which has a roof, a siren, lights capable of flashing, a siren actuator in the motor vehicle interior, and a flashing light actuator in the motor vehicle interior, comprising:

a roof-top-mounted support assembly mounted on the roof of the motor vehicle, a remote-controlled radar gun assembly mounted on said roof-top-mounted support assembly, a radar-gun control module contained within an interior portion of the motor vehicle and connected to said remote-controlled radar gun assembly by a cable assembly for controlling said remote-controlled radar gun assembly, such that a quantity of metal in the roof of the motor vehicle provides a protective barrier to a police officer inside the motor vehicle from radar waves emitted by said remote-controlled radar gun assembly, a first remote-controlled video camera assembly mounted on said roof-top-mounted support assembly, and a video camera actuator assembly, connected to said first remote-controlled video camera assembly at a location remote from said first remote-controlled video camera assembly and connected to the siren actuator and to the flashing light actuator, wherein said first remote-controlled video camera assembly is automatically activated by said video camera actuator assembly when either the siren actuator or the flashing light actuator is actuated by said police officer.

* * * * *